United States Patent
Ueki et al.

(10) Patent No.: US 9,190,668 B2
(45) Date of Patent: Nov. 17, 2015

(54) NONAQUEOUS ELECTROLYTE SECONDARY BATTERY

(75) Inventors: Tomoyoshi Ueki, Toyota (JP); Harunari Shimamura, Moriguchi (JP); Yusuke Fukumoto, Moriguchi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/703,949

(22) PCT Filed: Jun. 15, 2010

(86) PCT No.: PCT/JP2010/060139
§ 371 (c)(1),
(2), (4) Date: Dec. 13, 2012

(87) PCT Pub. No.: WO2011/158335
PCT Pub. Date: Dec. 22, 2011

(65) Prior Publication Data
US 2013/0084503 A1    Apr. 4, 2013

(51) Int. Cl.
| | | |
|---|---|---|
| H01M 2/14 | (2006.01) | |
| H01M 4/62 | (2006.01) | |
| H01M 2/16 | (2006.01) | |
| H01M 10/052 | (2010.01) | |
| H01M 10/0566 | (2010.01) | |
| H01M 10/0587 | (2010.01) | |

(52) U.S. Cl.
CPC ............ *H01M 4/626* (2013.01); *H01M 2/1646* (2013.01); *H01M 10/052* (2013.01); *H01M 10/0566* (2013.01); *H01M 10/0587* (2013.01); *Y02E 60/122* (2013.01)

(58) Field of Classification Search
None
See application file for complete search history.

(56) References Cited

U.S. PATENT DOCUMENTS

2009/0246614 A1    10/2009  Kim et al.
2011/0052987 A1     3/2011  Katayama et al.

FOREIGN PATENT DOCUMENTS

| CN | 101546822 | 9/2009 |
|---|---|---|
| JP | 11-060791 | 3/1999 |
| JP | 2002-8730 | 1/2002 |
| JP | 2009-238752 | 10/2009 |
| JP | 2010-015917 | 1/2010 |
| JP | 2010-092718 | 4/2010 |
| KR | 10-2009-0103011 | 10/2009 |
| WO | WO 2009/044741 | 4/2009 |

*Primary Examiner* — Cynthia K Walls
(74) *Attorney, Agent, or Firm* — Finnegan, Henderson, Farabow, Garrett & Dunner, LLP (57) ABSTRACT

A nonaqueous electrolyte secondary battery provided by the present invention includes an electrode body in which a positive electrode sheet and a negative electrode sheet 20 are laminated with a separator sheet 40 interposed therebetween. A porous layer 42 including an inorganic filler and a binder is formed on at least one surface of the separator sheet 40. The surface of the porous layer 42 is made uneven by forming peaks and valleys, and a maximum difference of elevation on an uneven surface 42*a* is 0.2 μm to 1.7 μm.

6 Claims, 5 Drawing Sheets

NONAQUEOUS ELECTROLYTE SECONDARY BATTERY

CROSS-REFERENCE TO RELATED APPLICATIONS

This application is a national phase application of International Application No. PCT/JP2010/060139, filed Jun. 15, 2010, the content of which is incorporated herein by reference.

TECHNICAL FIELD

The present invention relates to a nonaqueous electrolyte secondary battery, and more particularly to a nonaqueous electrolyte secondary battery with improved durability against high-rate charge and discharge.

BACKGROUND ART

In recent years, nonaqueous electrolyte secondary batteries such as lithium ion batteries and nickel hydride batteries have gained importance as power sources to be installed on vehicles and power sources for personal computers and portable terminals. In particular, lightweight lithium ion batteries that make it possible to obtain a high energy density are expected to be advantageously used as high-output power sources for vehicles. In a typical configuration of a lithium ion battery of this kind, charge and discharge are performed by the transfer of lithium ions between a positive electrode and a negative electrode. The conventional technology relating to lithium ion batteries is described, for example, in Patent Literature 1.

CITATION LIST

Patent Literature

Patent Literature 1: Japanese Patent Application Publication No. 2002-008730

There are some applications of lithium ion batteries for which the use in a mode with repeated high-rate discharge (high-speed discharge) can be assumed. Lithium ion batteries that are used as power sources for vehicles (for example, lithium ion batteries that are installed on hybrid vehicles in which the lithium ion battery and another power source that differs in the operation principle from the lithium ion battery, such as an internal combustion engine, are used together as a power source) are typical examples of lithium ion batteries for which such mode of use is assumed. However, even with comparatively high durability against low-rate charge-discharge cycle, the typical conventional lithium ion battery is known to be likely to demonstrate a degraded performance (increase in battery resistance, and the like) in a charge-discharge pattern in which a high-rate discharge is repeated.

Patent Literature 1 describes a technique for compensating the shortage of electrolytic solution between positive and negative electrodes and thus improving a discharge capacity of a battery by forming a thin layer with a thickness equal to or less than 20 μm that holds the electrolytic solution on the separator substrate. However, although the discharge capacity of the battery can be improved with such a technique, the durability against a charge-discharge pattern in which a high-rate discharge (for example, a high-rate discharge at a level that is required for lithium ion batteries for vehicular power sources) is repeated cannot be increased.

SUMMARY OF INVENTION

With the foregoing in view, it is a main object of the present invention to provide a nonaqueous electrolyte secondary battery in which durability against high-rate charge and discharge is increased.

The inventors have noticed that in a nonaqueous electrolyte secondary battery including an electrode body in which a positive electrode sheet and a negative electrode sheet are laminated with a separator sheet interposed therebetween, a significant increase in battery resistance is observed when charge and discharge are continuously repeated at a high rate such that can be supposed in nonaqueous electrolyte secondary batteries for vehicular power sources. Accordingly, the effect produced by such repeated high-rate charge and discharge on the nonaqueous electrolyte secondary battery has been analyzed in greater detail.

As a result, it was found that in a nonaqueous electrolyte secondary battery in which high-rate charge and discharge are repeated, the amount of the nonaqueous electrolytic solution impregnated between the positive and negative electrodes of the electrode body decreases, more specifically part of the nonaqueous electrolytic solution impregnated between the positive and negative electrodes of the electrode body is pushed out to the outside of the electrodes by the high-rate charge and discharge and the amount of the electrolytic solution between the positive and negative electrodes becomes less than necessary (that is a shortage of electrolytic solution occurs).

Where the shortage of electrolytic solution thus occurs between the positive and negative electrodes, since the amount of electrolytic solution inside the positive and negative electrodes during charge and discharge is insufficient, the high-rate charge-discharge performance of the entire battery is degraded. Further, since the battery reaction concentrates in a portion with a relatively large amount of electrolytic solution (that is, a portion where the electrolytic solution remains inside the positive and negative electrodes), the degradation advances in such a portion. All those effects can cause a decrease in durability (increase in battery resistance) of the nonaqueous electrolyte secondary battery against high-rate charge and discharge.

In accordance with the present invention, the durability of a nonaqueous electrolyte secondary battery against high-rate charge-discharge cycle is increased by following the approach of preventing or mitigating the shortage of electrolytic solution between the positive and negative electrodes which is based on the above-described knowledge.

A nonaqueous electrolyte secondary battery in accordance with the present invention includes an electrode body in which a positive electrode sheet and a negative electrode sheet are laminated with a separator sheet interposed therebetween. A porous layer including an inorganic filler and a binder is formed on at least one surface of the separator sheet. A surface of the porous layer is made uneven by forming peaks and valleys, and a maximum difference of elevation on an uneven surface is 0.2 μm to 1.7 μm.

With the configuration in accordance with the present invention, since the porous layer is formed on at least one surface of the separator sheet and the peaks and valleys are formed on the surface of the porous layer, a large amount of the nonaqueous electrolytic solution can be retained in the uneven surface. Therefore, even when part of the nonaqueous electrolytic solution impregnated in the positive and negative electrodes is pushed to the outside of the positive and negative electrodes by high-rate charge-discharge, the nonaqueous electrolytic solution retained in the uneven surface can be rapidly supplied to the positive and negative electrodes and the amount of the electrolytic solution inside the positive and negative electrodes can be rapidly restored. As a result, the shortage of the electrolytic solution inside the positive and negative electrodes that is caused by high-rate charge and discharge can be prevented or mitigated and the durability against charge-discharge cycle can be increased.

It is preferred that the maximum difference of elevation on the uneven surface be 0.2 μm to 1.7 μm. When the maximum difference of elevation on the uneven surface is less than 0.2 μm, the ability of the uneven surface to retain liquid is degraded and the above-described effect of increasing cyclic durability sometimes cannot be obtained. Where the maximum difference of elevation on the uneven surface exceeds 1.7 μm, the balance of the electrolytic solution amount between the positive and negative electrodes collapses and the battery reaction becomes uneven. As a result, the cyclic durability conversely tends to decrease.

In the preferred embodiment disclosed herein, the porous layer includes particles formed of an inorganic metal compound as the inorganic filler, and a cumulative 10% particle size (D10) in a particle size distribution (volume standard) of the metal compound particles is equal to or greater than 0.2 μm. Where the cumulative 10% particle size (D10) of the metal compound particles is too small, the porous layer is formed by aggregations of fine metal compound particles with a small particle size and therefore bonds between the metal compound particles are weakened and the durability of the porous layer is degraded. As a result, the uneven surface can easily collapse under the effect of pressure caused by expansion and contraction of the electrode body during high-rate charge-discharge, and the above-described effect of increasing the cyclic durability sometimes cannot be demonstrated.

It is also preferred that a cumulative 90% particle size (D90) in a particle size distribution (volume standard) of the metal compound particles be equal to or less than 4 μm. Where the porous layer is formed by aggregations of metal compound particles with a particle size arranged within such a narrow particle size distribution, bonds between the metal compound particles are strengthened and the durability of the porous layer further increases. Therefore, the uneven surface is unlikely to collapse even under the effect of pressure caused by expansion and contraction of the electrode body during high-rate charge-discharge, and the above-described effect of increasing the cyclic durability sometimes can be demonstrated more reliably.

In the preferred embodiment disclosed herein, the metal compound particles are alumina or alumina hydrate. Such metal compound particles are particularly preferred because they have a high Mohs hardness and therefore the durability of the porous layer formed using such particles is increased.

In the preferred embodiment disclosed herein, an amount of the binder in the porous layer is 1.5% by mass to 3% by mass, when a total amount of solids (typically, the total amount of the inorganic filler, binder, and other components (for example, a thickener)) contained in the porous layer is taken as 100% by mass. As a result, the maximum difference of elevation on the uneven surface is easily controlled to the preferred range disclosed herein.

In the preferred embodiment disclosed herein, the porous layer is formed on a surface of the separator sheet that faces the negative electrode sheet, and the uneven surface of the porous layer is formed at least at a position facing a negative electrode active material layer including a negative electrode active material in the negative electrode sheet. The shortage of electrolytic solution caused by high-rate charge and discharge easily occurs in the negative electrode active material layer including the negative electrode active material in the negative electrode sheet. Therefore, forming the uneven surface of the porous layer at a position facing a negative electrode active material layer is particularly effective.

The nonaqueous electrolyte secondary battery disclosed herein demonstrates performance (for example, the possibility of obtaining a high output) suitable for a battery to be installed on a vehicle. In particular, excellent durability against high-rate charge and discharge can be obtained. Therefore, the present invention provides a vehicle equipped with any of the nonaqueous electrolyte secondary batteries disclosed herein. In particular, the vehicle (for example, an automobile) can be provided that uses the nonaqueous electrolyte secondary battery as a power source (typically, a power source of a hybrid vehicle or an electric vehicle).

Examples of the preferred application objects of the technique disclosed herein include nonaqueous electrolyte secondary batteries for which the possibility of use in charge-discharge cycles including high-rate discharge equal to or higher than 50 A (for example, 50 A to 250 A), and also equal to or higher than 100 A (for example, 100 A to 200 A) can be assumed, and nonaqueous electrolyte secondary batteries of a high-capacity type that have a theoretic capacity equal to or higher than 1 Ah (even equal to or higher than 3 Ah) for which the possibility of use in charge-discharge cycles including high-rate discharge of equal to or higher than 10 C (for example, 10 C to 50 C) and also equal to or higher than 20 C (for example, 20 C to 40 C) can be assumed.

DESCRIPTION OF EMBODIMENTS

An embodiment of the present invention are described below with reference to the drawings. In the drawings, members and parts demonstrating the same action are assigned with same reference numerals. The dimensional relationships (length, width, thickness, and the like) in the drawings do not reflect actual dimensional relationships. Further, the features that are necessary for implementing the present invention, but are not specifically mentioned in the present description (for example, the configuration and method for manufacturing the electrode body provided with the positive electrode and negative electrode, the configuration and method for manufacturing the separator or electrolyte, and general techniques relating to the structure of nonaqueous electrolyte secondary batteries and other batteries) can be understood as design matters based on the conventional technology in this field for a person skilled in the art.

The present invention is explained below in greater detail with reference to a nonaqueous electrolyte lithium secondary battery (lithium ion battery) in which an electrode body that has been wound (wound electrode body) and a nonaqueous electrolytic solution are accommodated in a cylindrical container, but such a configuration is not intended to be limiting.

Figure 1:
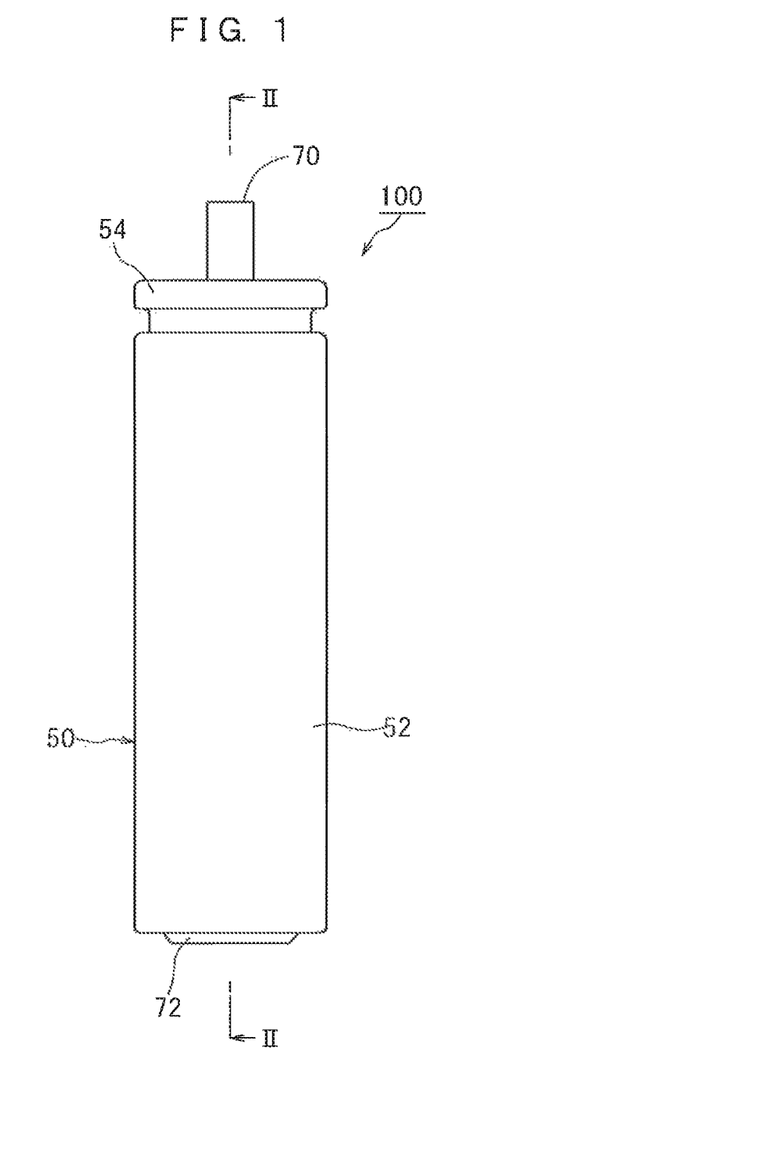
FIG. 1 is a side view illustrating schematically a lithium secondary battery of one embodiment of the present invention.
Figure 2:
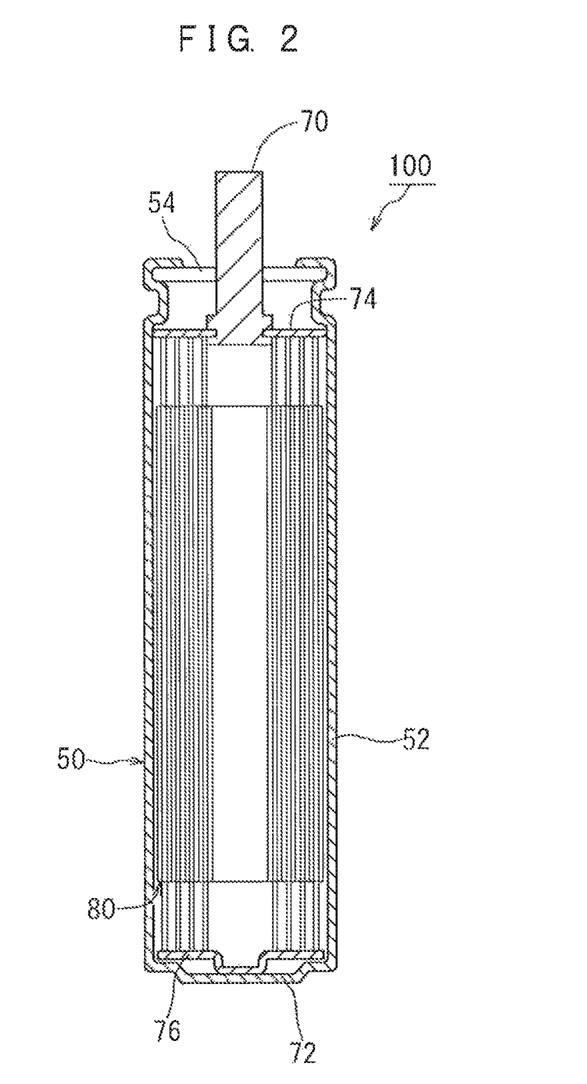
FIG. 2 is a sectional view along the II-II line in FIG. 1.
Figure 3:
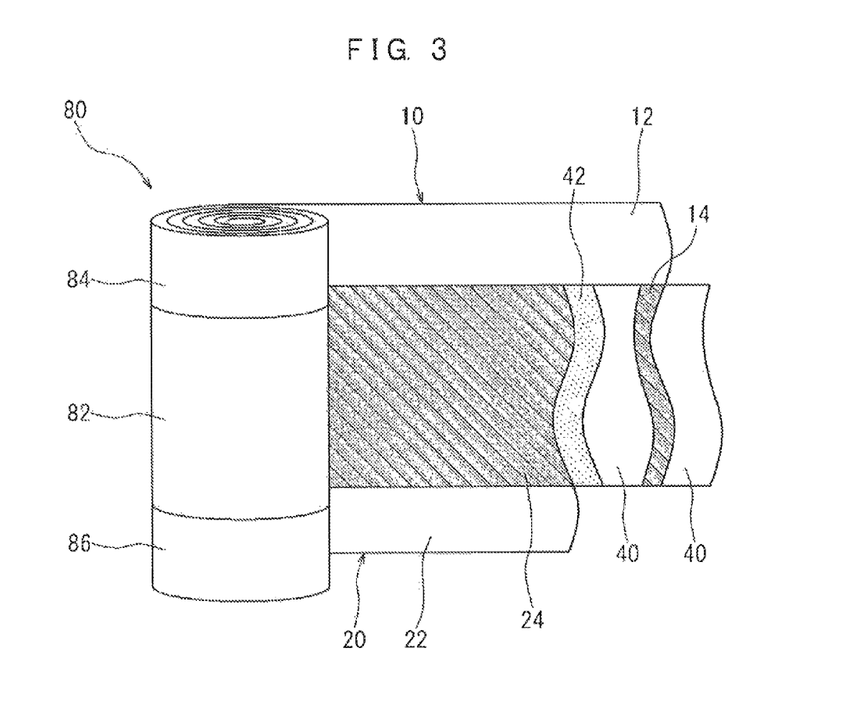
FIG. 3 illustrates schematically the electrode body of the lithium secondary battery of one embodiment of the present invention.

A schematic configuration of the lithium ion battery of one embodiment of the present invention is shown in FIGS. 1 to 3. This lithium ion battery 100 has a configuration in which an electrode body (wound electrode body) 80 of a form in which an elongated positive electrode sheet 10 and an elongated negative electrode sheet 20 are wound with an elongated separators 40 interposed therebetween is accommodated together with a nonaqueous electrolyte (not shown in the figure) in a case 50 having a shape (cylindrical shape) that allows the wound electrode body 80 to be accommodated therein.

The case 50 is provided with a case body 52 of an open-end cylindrical shape with an open upper end and a lid 54 that closes the opening. A metal material such as aluminum, steel, and Ni-plated. SUS can be advantageously used for constituting the case 50 (in the present embodiment, Ni-plated SUS is used). Alternatively, the case 50 obtained by molding a resin material such as PPS and a polyimide resin may be also used. A positive electrode terminal 70 that is electrically connected to the positive electrode 10 of the wound electrode body 80 is provided at the upper surface (that is, the lid 54) of the case 50. A negative electrode terminal 72 (in the present embodiment, the role of this terminal is played by the case body 52) that is electrically connected to the negative electrode 20 of the wound electrode body 80 is provided at the lower surface of the case 50. The wound electrode body 80 is accommodated together with the nonaqueous electrolytic solution (not shown in the figure) inside the case 50.

Except for the configuration of the below-described separator 40, the wound electrode body 80 according to the present embodiment is same as that of the usual lithium ion battery and has an elongated (band-shaped) sheet structure at a stage before the wound electrode body is assembled, as shown in FIG. 3.

The positive electrode sheet 10 has a structure in which a positive electrode active material layer 14 including a positive electrode active material is held on each surface of the foil-shaped positive electrode collector 12 in the form of an elongated sheet. However, the positive electrode active material layer 14 is not attached to one side edge (the side edge portion on the lower side in the figure) along the end side in the width direction of the positive electrode sheet 10, and a positive electrode active material layer non-formation portion of a predetermined width is formed in which the positive electrode collector 12 is exposed.

Similarly to the positive electrode sheet 10, the negative electrode sheet 20 also has a structure in which a negative electrode active material layer 24 including a negative electrode active material is held on each surface of the foil-shaped negative electrode collector 22 in the form of an elongated sheet. However, the negative electrode active material layer 24 is not attached to one side edge (the side edge portion on the upper side in the figure) along the end side in the width direction of the negative electrode sheet 20, and a negative electrode active material layer non-formation portion of a predetermined width is formed in which the negative electrode collector 22 is exposed.

When the wound electrode body 80 is fabricated, as shown in FIG. 3, the positive electrode sheet 10 and the negative electrode sheet 20 are stacked with the separator sheet 40 interposed therebetween. In this case, the positive electrode sheet 10 and the negative electrode sheet 20 are stacked with a certain shift in the width direction, so that the positive electrode active material layer non-formation portion of the positive electrode sheet 10 and the negative electrode active material layer non-formation portion of the negative electrode sheet 20 protrude from respective sides in the width direction of the separator sheet 40. The wound electrode body 80 can be fabricated by winding the laminated body that has thus been stacked.

A wound core portion 82 (that is, a portion where the positive electrode active material layer 14 of the positive electrode sheet 10, the negative electrode active material layer 24 of the negative electrode sheet 20, and the separator sheet 40 are tightly laminated) is formed in the central portion in the winding axis direction of the wound electrode body 80. At each end of the wound electrode body 80 in the winding axis direction, the electrode active material layer non-formation portions of the positive electrode sheet 10 and negative electrode sheet 20 protrude outward of the wound core portion 82. A protruding portion (that is, the non-formation portion of the positive electrode active material layer 14) 84 on the positive electrode side and a protruding portion (that is, the non-formation portion of the negative electrode active material layer 24) 86 on the negative electrode side are attached to a positive electrode lead terminal 74 and a negative electrode lead terminal 76, respectively, and electrically connected to the positive electrode terminal 70 and negative electrode terminal 72 (in this case, the case body 52 also serves as the negative electrode terminal), respectively.

With the exception of the separator sheet 40, the structural elements constituting the wound electrode body 80 are not particularly limited and may be same as those of the wound electrode body of the conventional lithium ion battery. For example, the positive electrode sheet 10 can be formed by attaching the positive electrode active material layer 14 including as the main component a positive electrode active material for a lithium ion battery to the elongated positive electrode collector 12. An aluminum foil or another metal foil suitable for a positive electrode can be advantageously used for the positive electrode collector 12. One, or two or more substances that have been used in the conventional lithium ion batteries can be used, without any particular limitation, as the positive electrode active material. A positive electrode active material including as the main component an oxide (lithium transition metal oxide) including lithium and a transition metal element as a structural metal element, such as lithium nickel oxide ($LiNiO_2$), lithium cobalt oxide ($LiCoO_2$), and lithium manganese oxide ($LiMn_2O_4$) is a preferred application object of the technique disclosed herein.

The negative electrode sheet 20 can be formed by attaching the negative electrode active material layer 24 including as the main component a negative electrode active material for a lithium ion battery to the elongated negative electrode collector 22. A copper foil or another metal foil suitable for a negative electrode can be advantageously used for the negative electrode collector 22. One, or two or more substances that have been used in the conventional lithium ion batteries can be used, without any particular limitation, as the negative electrode active material. The preferred examples include carbon-containing materials such as graphite carbon and amorphous carbon, lithium-containing transition metal oxides or transition metal nitrides.

A separator made of a porous polyolefin resin can be advantageously used as the separator sheet 40 between the positive and negative electrode sheets 10, 20. For example, a porous separator sheet made from a synthetic resin (for example, a polyolefin such as polyethylene) can be advantageously used. Such a separator sheet 40 is impregnated with a nonaqueous electrolytic solution.

In the present embodiment, as shown in FIG. 3, a porous layer 42 is formed on at least one surface of the separator sheet 40 constituting the wound electrode body. In this embodiment, the porous layer 42 is formed on the surface of the separator sheet that faces the negative electrode sheet 20. The porous sheet 42 is formed of an inorganic filler and a binder. The binder binds together the particles of the inorganic filler and also binds the inorganic filler to the separator sheet.

By so forming the porous layer 42 on the surface of the separator sheet that faces the negative electrode sheet 20, it is possible to inhibit heat generation in the event of internal short circuit. Thus, it can be supposed that where a foreign matter penetrates into the wound electrode body and a very small internal short circuit is generated, the separator sheet 40 is contracted by the heat of the internal short circuit and the internal short circuit expands (the battery then generates heat), but the expansion of the internal short circuit can be prevented and heat generation can be inhibited by providing the porous layer 42 as described above.

The inorganic filler constituting the porous layer 42 is preferably heat resistant and electrochemically stable within the operation range of the battery. Examples of such inorganic filler include particles formed of an inorganic metal compound. The preferred examples thereof include alumina ($Al_2O_3$), alumina hydrate (for example, boehmite ($Al_2O_3 \cdot H_2O$)), magnesium hydroxide ($Mg(OH)_2$), and magnesium carbonate ($MgCO_3$). One, or two or more kinds of such inorganic metal compound materials can be used. Among them, alumina and alumina hydrate are preferred because of a high Mohs hardness which can increase the durability of the porous layer.

The binder used in the porous layer 42 serves to bind together the particles of the inorganic filler. Materials suitable for constituting the binder are not particularly limited, and a broad variety of materials can be used. Acrylic resins are advantageous examples thereof. A homopolymer obtained by polymerizing a monomer of one kind selected from acrylic acid, methacrylic acid, acrylamide, methacrylamide, 2-hydroxyethyl acrylate, 2-hydroxyethyl methacrylate, methacrylate, methyl methacrylate, ethylhexyl acrylate, and butyl acrylate can be advantageously used as the acrylic resin. The acrylic resin may be also a copolymer obtained by copolymerizing monomers of two or more kinds. A mixture of the homopolymers and copolymers of two or more kinds may be also used. In addition to the acrylic resins, polyvinylidene fluoride, polytetrafluoroethylene (PTFE), polyacrylonitrile, and methyl polymethacrylate can be also used.

Figure 4:
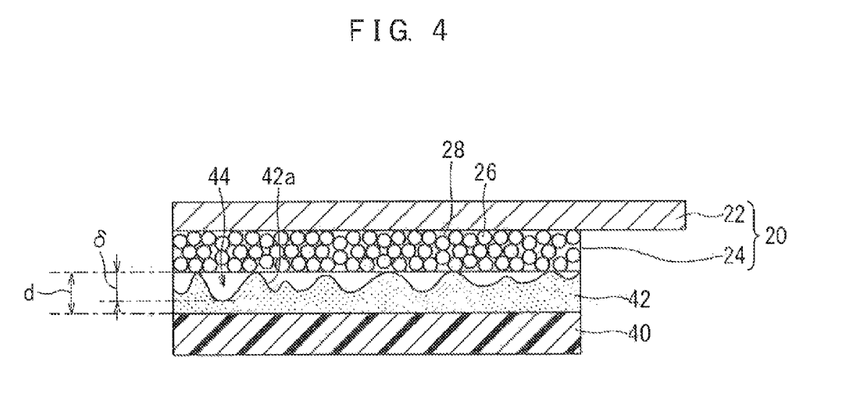
FIG. 4 is an enlarged cross-sectional view illustrating the principal portion of the lithium secondary battery of one embodiment of the present invention.

The wound electrode body 80 of the present embodiment is described below in greater detail by additionally referring to FIG. 4. FIG. 4 is a schematic cross-sectional view illustrating, on an enlarged scale, a portion of the cross section of the wound electrode body 80 of the present embodiment along the winding axis. This figure illustrates the separator sheet 40, the porous layer 42 formed on the front surface of the separator sheet 40, and the negative electrode sheet 20 facing the porous layer 42.

As shown in FIG. 4, the negative electrode active material layer 24 in the negative electrode sheet 20 is formed of negative electrode active material particles 26 and a binder (not shown in the figure). The negative electrode active material particles 26 are bound together, and the negative electrode active material particles 26 and the negative electrode collector 22 are bound together by the binder. A large number of pores 28 are formed in the zones between the adjacent negative electrode active material particles 26 to which the binder has not been attached, and a nonaqueous electrolytic solution is retained in the pores 28 (that is, the nonaqueous electrolytic solution is impregnated in the negative electrode active material layer).

In the conventional lithium secondary battery, where short-time (pulse current) discharging and charging are continuously repeated at a high rate which is assumed for lithium secondary batteries for vehicular power supplies, part of the nonaqueous electrolytic solution impregnated in the negative electrode active material layer 24 is pushed out to the outside of the negative electrode active material layer 24 and the amount of the electrolytic solution inside the negative electrode active material layer 24 can decrease below the necessary amount (that is, shortage of electrolytic solution occurs).

Where the shortage of electrolytic solution thus occurs inside the negative electrode active material layer 24, since the amount of electrolytic solution inside the negative electrode active material layer 24 during charge and discharge is insufficient, the high-rate charge-discharge performance of the entire battery is degraded. Further, since the battery reaction concentrates in a portion with a relatively large amount of electrolytic solution (that is, a portion where the electrolytic solution remains inside the negative electrode active material layer 24), the degradation advances in such a portion. Those effects can cause decrease in the durability (increase in battery resistance) of the lithium secondary battery against high-rate charge and discharge.

To resolve this problem, in the present embodiment, the porous layer 42 having the inorganic filler and the binder is formed on the surface of the separator sheet 40. The surface of the porous layer 42 is made uneven by forming peaks and valleys, and the maximum difference of elevation on the uneven surface 42*a* is 0.2 μm to 1.7 μm. In the present embodiment, the porous layer 42 is formed on the surface of the separator sheet 40 that faces the negative electrode sheet 20, and the uneven surface 42*a* of the porous layer 42 is formed at least at a position facing the negative electrode active material layer 24 including the negative electrode active material in the negative electrode sheet 20.

With such a configuration, since the porous layer 42 is formed on the surface of the separator sheet 40 that faces the negative electrode sheet 20 and the peaks and valleys are formed on the surface of the porous layer 42, a large amount of the nonaqueous electrolytic solution can be retained in the recesses 44 of the uneven surface 42*a*. Therefore, even when part of the nonaqueous electrolytic solution impregnated into the negative electrode active material layer 24 is pushed to the outside of the negative electrode active material layer 24 by high-rate charge-discharge, the nonaqueous electrolytic solution retained in the recesses 44 of the uneven surface 42*a* can be rapidly supplied to the negative electrode active material layer 24 and the amount of the electrolytic solution inside the negative electrode active material layer can be rapidly restored. As a result, the shortage of the electrolytic solution inside the negative electrode active material layer that is caused by high-rate charge and discharge can be prevented or mitigated and the durability against charge-discharge cycle can be increased.

It is preferred that the maximum difference δ in height on the uneven surface be 0.2 μm to 1.7 μm. When the maximum difference δ in height on the uneven surface is less than 0.2 μm, the ability of the uneven surface to retain liquid is degraded and the above-described effect of increasing cyclic durability sometimes cannot be obtained. Where the maximum difference δ in height on the uneven surface exceeds 1.7 μm, the balance of the electrolytic solution amount between the positive and negative electrodes collapses and the battery reaction becomes uneven. As a result, the cyclic durability conversely tends to decrease. The maximum difference $\delta$ in height on the uneven surface generally can be 0.2 µm to 1.7 µm, preferably 0.3 µm to 1.5 µm, and more preferably 0.5 µm to 1.5 µm.

It is preferred that the thickness d of the porous layer 42 (maximum thickness including the uneven surface) be 2 µm to 50 µm. Where the porous layer 42 is too thick, the porous layer itself acts as a resistance component and therefore cycling durability can tend to degrade. Where the porous layer 42 is too thin, the effect of inhibiting heat generation during the internal short circuit sometimes cannot be obtained. The suitable thickness d of the porous layer is generally 2 µm to 50 µm, preferably 2 µm to 10 µm, even more preferably 3 µm to 7 µm.

It is preferred that the porosity of the porous layer 42 be about 40% to 70%. Where the porosity of the porous layer 42 is too small, the porous layer itself acts as a resistance component and therefore cycling durability can tend to degrade. Where the porosity of the porous layer 42 is too large, the effect of inhibiting heat generation during the internal short circuit sometimes cannot be obtained. The porosity can be determined by calculations, for example, from the mass of the porous layer measured with an electronic balance, the apparent volume thereof (product of the thickness and surface area of the porous layer measured by SEM observations), and the true density of the inorganic filler, binder, and of constituent components of the porous layer.

The maximum difference $\delta$ in height on the uneven surface can be adjusted by changing the particle size (average particle diameter or particle size distribution (broad or narrow)) of the metal compound particles used in the porous layer. Since the filling ratio of the porous layer typically decreases with the increase in particle size, the maximum difference of elevation on the uneven surface tends to increase. Therefore, the maximum difference of elevation on the uneven surface can be controlled by changing the particle size (average particle diameter or particle size distribution) of the metal compound particles. Thus, by adequately selecting the particle size (average particle diameter or particle size distribution) of the metal compound particles, it is possible to form a porous layer with the maximum difference of elevation on the uneven surface within a range of 0.2 µm≤$\delta$≤1.7 µm.

It is preferred that the average particle diameter (D50), based on a laser diffraction-scattering method, of the metal compound particles be about 0.4 µm to 2 µm, although this range is not limiting. In such a case, the maximum difference $\delta$ in height on the uneven surface can be easily controlled to the preferred range disclosed herein.

It is also preferred that a cumulative 10% particle size (D10) in a particle size distribution (volume standard), based on laser diffraction-scattering method, of the metal oxide particles be equal to or greater than 0.2 µm. Where the cumulative 10% particle size (D10) of the metal compound particles is too small, the porous layer 42 is formed by aggregations of fine metal compound particles with a small particle size and therefore bonds between the metal compound particles are weakened and the durability of the porous layer 42 is degraded. As a result, the uneven surface 42a can easily collapse under the effect of pressure caused by expansion and contraction of the wound electrode body during high-rate charge-discharge, and the above-described effect of increasing the cyclic durability sometimes cannot be demonstrated. The suitable cumulative 10% particle size (D10) of the metal compound particles is equal to or greater than 0.2 µm, preferably equal to or greater than 0.24 µm, even more preferably equal to or greater than 0.3 µm.

It is also preferred that a cumulative 90% particle size (D90) in a particle size distribution (volume standard), based on a laser diffraction-scattering method, of the metal oxide particles be equal to or less than 4 µm. Where the porous layer 42 is formed by aggregations of metal compound particles with a particle size arranged within such a narrow particle size distribution, bonds between the metal compound particles are strengthened and the durability of the porous layer 42 further increases. Therefore, the uneven surface 42a is unlikely to collapse even under the effect of pressure caused by expansion and contraction of the wound electrode body during high-rate charge-discharge, and the above-described effect of increasing the cyclic durability can be demonstrated more reliably. The suitable cumulative 90% particle size (D90) of the metal compound particles is equal to or less than 4 µm, preferably equal to or less than 3.5 µm, even more preferably equal to or less than 2.9 µm.

Another method for realizing an uneven surface for which the preferred value of the maximum difference $\delta$ in height that is disclosed herein is satisfied includes adequately selecting the formation conditions for forming the porous layer. For example, the porous layer can be formed by preparing a coating material for forming the porous layer in which metal oxide particles, binder, and other components forming the porous layer (for example, a thickener) are disposed in a suitable solvent, the coating material is applied to one surface or each surface of the separator sheet, and the coating is then dried with a drying air flow. In this case, the maximum difference $\delta$ in height on the uneven surface can be controlled by selecting drying conditions such as the drying temperature and drying air speed. Thus, by adequately selecting drying conditions such as the drying temperature and drying air speed, it is possible to form a porous layer for which the maximum difference $\delta$ in height on the uneven surface satisfies the condition of 0.2 µm≤$\delta$≤1.7 µm. The drying temperature can be set to a value equal to or higher than about 40° C. (for example, 40° C. to 80° C.), but this value is not particularly limiting. The drying air speed may be set to a value equal to or higher than about 17 m/s (for example, 17 m/s to 22 m/s). The maximum difference of elevation on the uneven surface may thus be controlled to the preferred range disclosed herein.

Another method for adjusting the maximum difference $\delta$ in height on the uneven surface to the adequate range includes changing the ratio of solids or the amount of binder in the coating material for forming the porous layer. Where the ratio of solids or the amount of binder in the coating material for forming the porous layer is increased, the viscosity increases and therefore the smoothness of the coated surface is degraded. As a result, the maximum difference $\delta$ in height on the uneven surface tends to increase. Therefore, the maximum difference $\delta$ in height on the uneven surface can be controlled by changing the ratio of solids or the amount of binder in the coating material for forming the porous layer. Thus, by adequately selecting the ratio of solids or the amount of binder in the coating material for forming the porous layer, it is possible to form a porous layer for which the maximum difference $\delta$ in height on the uneven surface satisfies the condition of 0.2 µm≤$\delta$≤1.7 µm. It is preferred that the ratio of solids in the coating material for forming the porous layer be equal to or higher than about 40% by mass (typically 40 to 50% by mass), but this value is not particularly limiting. It is also preferred that the amount of binder be equal to or greater than about 1.5% by mass (typically 1.5 to 4.5% by mass), where the amount of solids contained in the coating material for forming the porous layer (typically, the total amount of the inorganic filler, binder, and other components forming the porous layer) is taken as 100% by mass. As a result, the maximum difference of elevation on the uneven surface may thus be controlled to the preferred range disclosed herein. The methods for controlling the maximum difference δ in height on the uneven surface can be used individually or in a combination thereof.

Organic solvents such as N-methyl pyrrolidone (NMP), pyrrolidone, methyl ethyl ketone, methyl isobutyl ketone, cyclohexanone, toluene, dimethyl formamide, and dimethyl acetamide or combinations of two or more thereof can be used as the solvent for the paste for forming the porous layer. Alternatively, water or a mixed solvent based on water may be also used. One or two or more organic solvents (lower alcohols, lower ketones, and the like) that can be homogeneously mixed with water can be used as the solvents other than water that constitute such mixed solvents.

In addition to the inorganic filler and binder, the coating material for forming the porous layer can include one, or two or more materials that can be used as necessary. Examples of such materials include polymers that function as thickeners for the coating material for forming the porous layer. For example, carboxymethyl cellulose (CMC) can be advantageously used as the polymer functioning as the thickener. The amount of the thickener is preferably equal to or less than about 1.5% by mass, more preferably equal to or less than about 1% by mass (for example, about 0.5 to 1% by mass), where the amount of solids contained in the coating material for forming the porous layer is taken as 100% by mass.

The porous layer 42 is formed on the surface of the separator sheet 40 by applying such coating material for forming the porous layer to the surface of the separator sheet 40 and drying. In this case, the particle diameter (particle size distribution) of the inorganic filler contained in the coating material for forming the porous layer, the amount of binder, the amount of solids, and/or the drying conditions (for example, the drying conditions such as the drying temperature and drying air speed) during drying of the coating material for forming the porous layer may be set such as to realize the maximum difference δ in height, and the porous layer 42 may be formed according to the conditions that have thus been set. As a result, it is possible to form the porous layer for which the maximum difference δ in height on the uneven surface satisfies the condition of 0.2 μm≤δ≤1.7 μm.

Once the porous layer 42 has thus been formed on the surface of the separator sheet 40, the positive electrode sheet 10 and the negative electrode sheet 20 are wound, with two separator sheets interposed therebetween, and the wound electrode body 80 is fabricated. The wound electrode body 80 is accommodated in a container body 52, and the appropriate nonaqueous electrolytic solution is disposed in (poured into) the container body 52. An electrolytic solution similar to the nonaqueous electrolytic solutions that are used in the conventional lithium ion batteries can be used without any particular limitation as the nonaqueous electrolytic solution that is accommodated together with the wound electrode body 80 inside the container body 52. Such a nonaqueous electrolytic solution typically has a composition in which a support salt is included in an appropriate nonaqueous solvent. Examples of suitable nonaqueous solvents include ethylene carbonate (EC), ethyl methyl carbonate (EMC), dimethyl carbonate (DMC), diethyl carbonate (DEC), and propylene carbonate (PC). Further, for example, a lithium salt such as $LiPF_6$, $LiBF_4$, $LiAsF_6$, $LiCF_3SO_3$, and $LiClO_4$ can be advantageously used as the support salt. For example, a nonaqueous electrolytic solution including $LiPF_6$ as a support salt at a concentration of about 1 mol/L in a mixed solvent including EC, EMC, and DMC at a volume ratio of 3:4:3 can be advantageously used.

The nonaqueous electrolytic solution is accommodated together with the wound electrode body 80 in the container body 52, and the opening of the container body 52 is sealed with a lid 54, thereby completing the process of constructing (assembling) the lithium ion battery 100 of the present embodiment. The process of sealing the container body 52 and the process of disposing (pouring) the electrolytic solution can be performed in the same manner as in the methods for manufacturing the conventional lithium ion batteries. The conditioning (initial charge-discharge) of the battery is then performed. If necessary, gas draining or quality inspection may be also performed.

Test examples relating to the present invention are explained below, but the present invention is not intended to be limited to the below-described test examples.

Test Example 1

Adjustment of Particle Size Distribution of Inorganic Filler

A metal compound powder as an inorganic filler was ground for 5 min under a blow pressure of 0.2 MPa by using a jet mill (manufactured by Hosokawa Micron Co.) and classified to a size equal to or less than 4 μm by using an air-flow powder classification apparatus (manufactured by Kuma Engineering Co.). The particle size distribution (D10, D90) of the resulting metal compound powder was measured with a particle size distribution meter of a laser diffraction and scattering type (manufactured by Nikkiso Co.).

In the present test, as shown in Table 1, metal compound powders of five types, namely, magnesium carbonate, magnesium hydroxide, boehmite, α-alumina, and titania, were used and metal compound powders with different cumulative 10% diameters (D10) and cumulative 90% diameters (D90) in the particle size distribution (volume standard) were fabricated by the above-described procedure (samples 1 to 15).

TABLE 1

| | | Porous layer | | | | Paste for forming porous layer | | | |
|---|---|---|---|---|---|---|---|---|---|
| | Max. dif. δ in height (μm) | Max. thickness (μm) | Filler particle size (D10) (μm) | Filler particle size (D90) (μm) | Filler type | Content of solids (%) | Amount of binder (%) | Drying temp. (°C.) | Drying air speed (m·s$^{-1}$) |
| Sample 1 | 0.2 | 3.5 | 0.2 | 4 | Magnesium carbonate | 40 | 1.5 | 40 | 17.2 |
| Sample 2 | 0.3 | 4 | 0.22 | 3.8 | Magnesium hydroxide | 40 | 1.5 | 40 | 17.8 |

TABLE 1-continued

| | | | | | | | | | |
|---|---|---|---|---|---|---|---|---|---|
| Sample 3 | 0.5 | 4.5 | 0.24 | 3.5 | Boehmite | 41 | 1.8 | 45 | 18.6 |
| Sample 4 | 0.5 | 4.5 | 0.23 | 3.6 | α-Alumina | 41 | 1.8 | 45 | 18.6 |
| Sample 5 | 0.75 | 4.7 | 0.25 | 3.4 | α-Alumina | 41 | 1.9 | 70 | 18.9 |
| Sample 6 | 0.8 | 5 | 0.26 | 3.2 | Boehmite | 41 | 2 | 75 | 19.1 |
| Sample 7 | 1 | 5.5 | 0.3 | 2.9 | α-Alumina | 42 | 2.1 | 80 | 19.4 |
| Sample 8 | 1.2 | 6 | 0.33 | 2.7 | α-Alumina | 42 | 2.3 | 80 | 21 |
| Sample 9 | 1.5 | 6.5 | 0.35 | 2.5 | Boehmite | 43 | 2.5 | 80 | 21.3 |
| Sample 10 | 1.7 | 7 | 0.38 | 2.3 | Magnesium hydroxide | 43 | 2.7 | 65 | 21.6 |
| Sample 11 | 1.7 | 7.2 | 0.37 | 2.4 | Titania | 43 | 2.6 | 65 | 21.5 |
| Sample 12 | 0.1 | 9 | 0.1 | 6 | Titania | 38 | 1 | 60 | 15.6 |
| Sample 13 | 0.12 | 4.3 | 0.15 | 4.1 | α-Alumina | 38 | 1 | 35 | 16.8 |
| Sample 14 | 2 | 10 | 0.05 | 5 | Titania | 38 | 1.2 | 30 | 15.6 |
| Sample 15 | 2.1 | 3.9 | 0.48 | 2 | α-Alumina | 50 | 3.2 | 60 | 22.0 |

| | Separator | | | Evaluation test | | |
|---|---|---|---|---|---|---|
| | Type of substrate | Porosity of substrate (%) | Thickness of substrate (μm) | Membrane resistance (Ω) | Resistance increase ratio (%) | Safety |
| Sample 1 | PE | 47 | 20 | 1.6 | 13 | E |
| Sample 2 | PE | 47 | 20 | 1.4 | 11 | E |
| Sample 3 | PE | 47 | 20 | 1.1 | 5.5 | E |
| Sample 4 | PE | 47 | 20 | 1.2 | 6 | E |
| Sample 5 | PP/PE/PP | 47 | 20 | 1.08 | 5 | E |
| Sample 6 | PP/PE/PP | 47 | 20 | 1.05 | 4.8 | E |
| Sample 7 | PP/PE/PP | 47 | 20 | 1.02 | 4 | E |
| Sample 8 | PP/PE/PP | 47 | 20 | 0.97 | 3.5 | E |
| Sample 9 | PP/PE/PP | 47 | 20 | 1 | 2 | E |
| Sample 10 | PP/PE/PP | 47 | 20 | 1.2 | 10 | E |
| Sample 11 | PP/PE/PP | 47 | 20 | 1.1 | 9 | E |
| Sample 12 | PP/PE/PP | 47 | 20 | 2.2 | 230 | P |
| Sample 13 | PP/PE/PP | 47 | 20 | 2.1 | 260 | P |
| Sample 14 | PE | 47 | 20 | 2.3 | 260 | P |
| Sample 15 | PP/PE/PP | 47 | 20 | 2.4 | 310 | P |

Test Example 2

Preparation of Coating Materials for Forming Porous Layer

Coating materials for forming a porous layer were prepared using the metal compound powders fabricated in Test Example 1. More specifically, in sample 1, a magnesium carbonate powder as an inorganic filler, an aqueous solution of an acrylic binder (amount of solids was 45% by mass), and a carboxymethyl cellulose (CMC) as a thickener were prepared and mixed in water to obtain a mass ratio of the inorganic filler, binder, and thickener of 97.8:1.5:0.7 and an amount of solids of about 40% by mass. The mixture was preliminary kneaded for 5 min at 15,000 rpm with a high-speed stirring disperser (CREAMIX, manufactured by M Technique Co.), and then kneaded for 15 min at 20,000 rpm to prepare a coating material for forming a porous layer.

In samples 2 to 15, the pastes for forming a porous layer were prepared in the same manner as in sample 1 by the above-described procedure by changing the amount of solids and binder amount (the amount of binder in the entire solid component of the coating material for forming a porous layer) as shown in Table 1.

Test Example 3

Formation of Porous Layer

Porous layers 42 were formed by applying the coating materials for forming a porous layer of various types prepared in Test Example 2 on one surface of the elongated separator 40 (thickness 20 μm) with a gravure roll and drying. The drying conditions were adjusted such that the running speed A of the separator sheet was 3 m/min., the rotation speed B of the gravure roll was 3.8 m/min., the ratio of the rotation speed B of the gravure roll to the running speed A of the separator sheet (speed ratio=B/A) was 1.27, and the applied amount of the coating material for forming a porous layer was about 0.7 mg/cm² (solid fraction standard). The drying was performed by a hot air drying method using drying air. More specifically, the porous layers were formed by the above-described procedure, while changing the drying temperature of the drying air and the drying air speed for each sample as shown in Table 1. A separator of a single-layer structure formed of polyethylene (PE) and a separator of a three-layer structure formed of polypropylene (PP)-polyethylene (PE)-polypropylene (PP).

The maximum difference δ in height of the surface peaks and valleys (on the uneven surface) was measured by observing the cross-sections of the resulting porous layers of samples 1 to 15 under an electron microscope (SEM). More specifically, sampling extraction was performed and the distance (interval) between the highest point and the lowest point on the uneven surface within a reference length of 3 cm was taken as the maximum difference δ in height. The sampling extraction involved selecting three equidistant locations in the TD direction (Transverse Direction) and selecting three locations with a reference length interval of 3 cm in the MD direction (Machine Direction) (a total of nine locations). The maximum difference δ in height on the uneven surface within a reference length of 3 cm was measured for each case and the average value was determined.

Test Example 4

Measurement of Membrane Resistance

Figure 5:
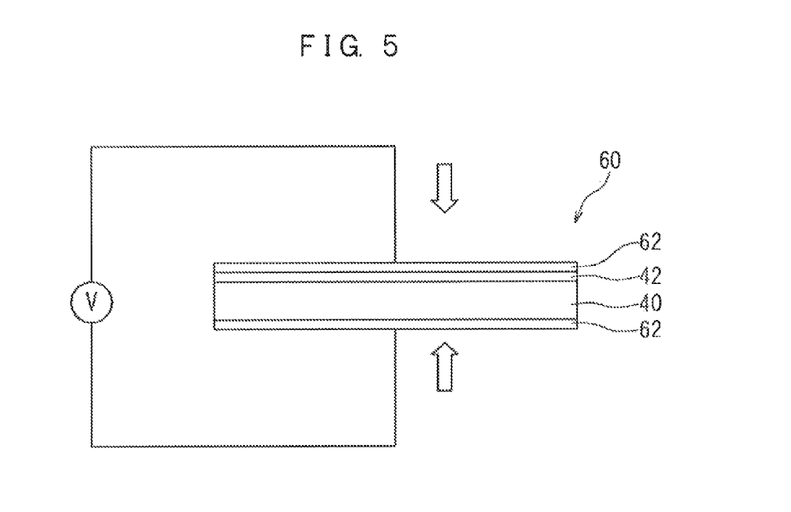
FIG. 5 illustrates a method for measuring the membrane resistance in one of the test examples.

Lithium secondary batteries (laminate cells) were fabricated by using separator sheets 40 provided with the porous layers 42 of various types that were fabricated in Test Example 3, and the membrane resistance (Rs) thereof was measured. More specifically, as shown in FIG. 5, the porous layer 42 and the separator sheet 40 were impregnated with a nonaqueous electrolytic solution, and the resulting configuration was sandwiched between two copper plates 62 with a surface area of 35 mm$^2$ and a thickness of 1 mm to produce a laminate cell 60. A solution in which LiPF$_6$ as a support salt was included at a concentration of about 1 mol/L in a mixed solvent including ethylene carbonate (EC), dimethyl carbonate (DMC), and ethyl methyl carbonate (EMC) at a volume ratio of 3:4:3 was used as the nonaqueous electrolytic solution. The AC impedance of the laminate cell 60 was then measured at a temperature of 25° C., while applying a torque pressure of 50 cN·m from above and below of the copper plates 62, and the membrane resistance (Rs) was determined from the resulting Cole-Cole plot. The AC impedance was measured at an AC applied voltage of 5 mV and within a frequency range of 10,000 Hz to 1 Hz. Each cell was fabricated with the number of the separator sheets sandwiched by the two copper plates 62 being 1, 2, and 3. A resistance value was then measured by an AC impedance method, the resulting resistance value was plotted with respect to the number of the separator sheets, and the membrane resistance (Rs) per one separator sheet was determined by linear approximation.

As clearly follows from Table 1, the membrane resistance of samples 1 to 11 with a maximum difference of elevation on the uneven surface of 0.2 μm≤δ≤1.7 μm was equal to or less than 1.6Ω, and the membrane resistance was substantially reduced with respect to those of samples 12 to 15. In particular, an extremely low membrane resistance equal to or less than 1.2Ω could be realized by setting the maximum difference of elevation to 0.5 μm≤δ≤1.5 μm.

Test Example 5

High-Rate Durability Test

Lithium secondary batteries were fabricated using the separator sheets 40 provided with various porous layers 42 that have been fabricated in Test Examples 3, and high-rate durability of the batteries was evaluated. The lithium secondary battery was fabricated in the following manner.

A powder of Li$_{1.15}$Ni$_{0.33}$Mn$_{0.33}$Co$_{0.33}$O$_2$ as a positive electrode active material, acetylene black (AB) as an electrically conductive material, and polyvinylidene fluoride (PVdF) as a binder were mixed in N-methyl pyrrolidone (NMP) to obtain a mass ratio of those materials of 88:10:2, and a paste for a positive electrode active material layer was prepared. The paste for a positive electrode active material was band-like coated on each surface of an elongated sheet-shaped aluminum foil (positive electrode collector 12), thereby fabricating a positive electrode sheet 10 provided with the positive electrode active material layer 14 on each surface of the positive electrode collector 12. The coated amount of the paste for a positive electrode active material was adjusted to about 17.2 mg/cm$^2$ (solid fraction standard) on each side.

Then, a paste for a negative electrode active material layer was prepared by dispersing a graphite powder as a negative electrode active material, a styrene-butadiene rubber (SBR) as a binder, and carboxymethyl cellulose (CMC) as a thickener in water to obtain a mass ratio of those materials of 98.6:0.7:0.7. The paste for a negative electrode active material layer was coated on each surface of an elongated sheet-shaped copper foil (negative electrode collector 22), and the negative electrode sheet 20 provided with the negative electrode active material layer 24 on each side of the negative electrode collector 22 was fabricated. The coated amount of the paste for a negative electrode active material was adjusted to about 11.1 mg/cm$^2$ (solid fraction standard) on each side.

Then the wound electrode body 80 was fabricated by winding the positive electrode sheet 10 and the negative electrode sheet 20 with two separator sheets 40 interposed therebetween. In this case, the arrangement was such that the porous layer 42 on the surface of the separator sheet and the negative electrode sheet 20 faced each other. The wound electrode body 80 thus obtained was accommodated together with a nonaqueous electrolytic solution in a battery container 50 (in this case, a cylindrical case of a 18650 type was used), and the opening of the battery container 50 was air-tightly sealed. A solution in which LiPF$_6$ as a support salt was included at a concentration of about 1 mol/L in a mixed solvent including ethylene carbonate (EC), ethyl methyl carbonate (EMC), and dimethyl carbonate (DMC) at a volume ratio of 3:4:3 was used as the nonaqueous electrolytic solution. The lithium secondary battery 100 was thus assembled. Then, a lithium secondary battery for evaluation was obtained by performing the initial charge and discharge (conditioning) by the usual method.

Each of the lithium secondary batteries obtained in the above-described manner was subjected to a charge-discharge cycle test with a charge-discharge pattern in which a 10-s CC discharge of 20 C was repeated. More specifically, 10,000 charge-discharge cycles were continuously repeated, each cycle including a 10-s CC discharge of 20 C, a 5-s pause, and a 40-s CC charge of 5 C.

The resistance increase ratio was calculated from the IV resistance (initial resistance of the lithium ion battery) before the charge-discharge cycle test and the IV resistance after the charge-discharge cycle test. In this case, the IV resistance before and after the charge-discharge cycle test was calculated after 10 s of discharge when a pulse current discharge of 30 C was performed at 25° C. The resistance increase ratio (%) was determined from [(the IV resistance after the charge-discharge cycle test)−(the IV resistance before the charge-discharge cycle test)/(the IV resistance before the charge-discharge cycle test)]×100. The results are shown in Table 1.

As clearly follows from Table 1, in samples 12 and 13 in which the maximum difference of elevation on the uneven surface was below 0.2 μm, the resistance increase ratio exceeded 200%. In samples 14 and 15 in which the maximum difference of elevation on the uneven surface was above 1.7 μm, the resistance increase ratio also exceeded 200%. By contrast, in the batteries of samples 1 to 11 in which the maximum difference of elevation on the uneven surface satisfied the condition 0.2 µm≤δ≤1.7 µm, the resistance practically did not increase even after 10,000 cycles of high-rate charge-discharge, and the resistance increase ratio assumed a low value equal to or less than 15%. In particular, an extremely low resistance increase ratio that was equal to or less than 6% could be achieved by setting the maximum difference of elevation to 0.5 µm≤δ≤1.5 µm. This result confirmed that the durability of the lithium secondary battery against high-rate charge and discharge could be increased by making the maximum difference of elevation on the uneven surface within a range of 0.2 µm≤δ≤1.7 µm (preferably, 0.5 µm≤δ≤1.5 µm).

Test Example 6

Foreign Matter Internal Short Circuit Test

Lithium secondary batteries were fabricated in the same manner as in Test Example 5, and a foreign matter internal short circuit test was conducted. The foreign matter internal short circuit test was performed according to JIS C8714 by using an L-shaped small nickel piece with a height of 0.2 mm, a width of 0.1 mm, and a size of one side of 1 mm. The presence of NG products in which abnormal fuming has occurred was then investigated. The results are shown in Table 1. The samples without fuming are represented in the table by E (excellent) and those with fuming are represented in the table by P (poor).

Table 1 confirms that in samples 1 to 11 in which the maximum difference of elevation on the uneven surface was 0.2 µm≤δ≤1.7 µm, none of the batteries demonstrated abnormal fuming and batteries of excellent safety were obtained.

The preferred embodiment of the present invention is described above, but this description is not limiting and it goes without saying that various modifications can be made.

For example, in the above-described embodiment, the case is described in which the porous layer 42 is formed on the surface facing the negative electrode sheet 20 of the separator sheet 40, but such configuration is not limiting, and the porous layer may be also formed on the surface facing the positive electrode sheet of the separator sheet (or on each surface).

Further, the shape (outer shape or size) of the configured lithium secondary battery is not particularly limited, provided that a configuration is used in which a porous layer having an uneven surface on which the maximum difference δ in height has a preferred value disclosed herein is provided on the separator surface. Thus, the battery may be a thin sheet-type battery in which the outer case is configured of a laminated film, a battery with a cylindrical or rectangular parallelepiped shape of the outer case, or a small button-type battery.

Figure 6:
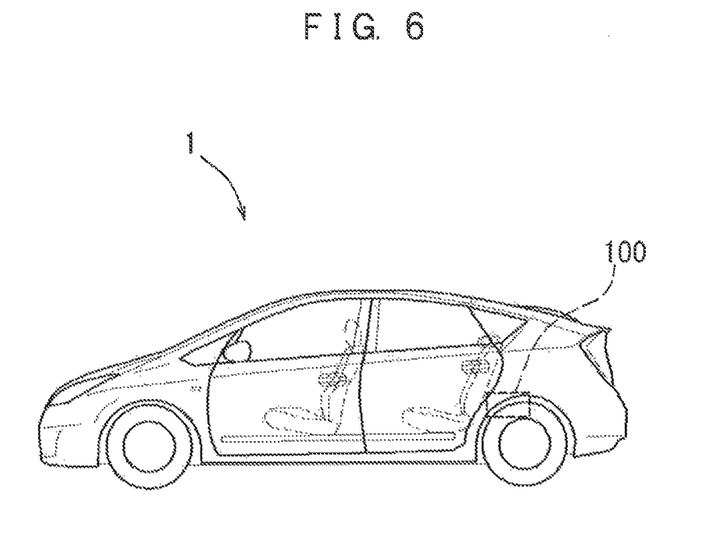
FIG. 6 is a side view illustrating schematically a vehicle equipped with the lithium secondary battery of one embodiment of the present invention.

Any of the lithium secondary batteries 100 disclosed herein demonstrates performance (for example, the possibility of obtaining a high output) suitable for a battery to be installed on a vehicle. In particular, excellent durability against high-rate charge and discharge can be obtained. Therefore, as shown in FIG. 6, the present invention provides a vehicle 1 equipped with any of the lithium secondary batteries 100 disclosed herein. In particular, the vehicle 1 (for example, an automobile) can be provided that uses the lithium secondary battery 100 as a power source (typically, a power source of a hybrid vehicle or an electric vehicle).

Examples of the preferred application objects of the technique disclosed herein include the lithium secondary battery 100 for which the possibility of use in charge-discharge cycles including high-rate discharge equal to or higher than 50 A (for example, 50 A to 250 A), and also equal to or higher than 100 A (for example, 100 A to 250 A) can be assumed, and lithium secondary batteries of a high-capacity type that have a theoretic capacity equal to or higher than 1 Ah (even equal to or higher than 3 Ah) for which the possibility of use in charge-discharge cycles including high-rate discharge of equal to or higher than 10 C (for example, 10 C to 50 C) and also equal to or higher than 20 C (for example, 20 C to 40 C) can be assumed.

INDUSTRIAL APPLICABILITY

According to the features of the present invention, a nonaqueous electrolyte secondary battery can be provided that has increased durability against high-rate charge and discharge.

The invention claimed is:

1. A nonaqueous electrolyte secondary battery, comprising:
    a positive electrode sheet;
    a negative electrode sheet;
    a separator sheet interposed between the positive electrode sheet and the negative electrode sheet; and
    a porous layer formed on the separator sheet;
    wherein
    the porous layer including an inorganic filler and a binder, and
    a surface of the porous layer is made uneven by forming peaks and valleys, and a maximum difference of elevation δ on an uneven surface is 0.2 µm to 1.7 µm,
    wherein the maximum difference of elevation δ is determined by (1) selecting three equidistant locations in a transverse direction and selecting three locations with a reference length interval of 3 cm in a machine direction (a total of nine locations), (2) observing a cross-section of the porous layer at each location by an electron microscope, (3) measuring a distance between a highest point and a lowest point on the uneven surface within the reference length of 3 cm at each location, and (4) calculating an average value of the distance.

2. The nonaqueous electrolyte secondary battery according to claim 1, wherein the porous layer includes particles formed of an inorganic metal compound as the inorganic filler, and
    a cumulative 90% particle size (D90) in a particle size distribution of the metal compound particles is equal to or less than 4 µm and greater than a cumulative 10% particle size (D10), wherein the cumulative 10% particle size (D10) in the particle size distribution of the metal compound particles is equal to or greater than 0.2 µm.

3. The nonaqueous electrolyte secondary battery according to claim 2, wherein the metal compound particles are alumina or alumina hydrate.

4. The nonaqueous electrolyte secondary battery according to claim 1, wherein an amount of the binder in the porous layer is 1.5% by mass to 3% by mass, when a total amount of solids contained in the porous layer is taken as 100% by mass.

5. The nonaqueous electrolyte secondary battery according to claim 1, wherein the porous layer is formed on a surface of the separator sheet that faces the negative electrode sheet, and the uneven surface of the porous layer is formed at least at a position facing a negative electrode active material layer including a negative electrode active material in the negative electrode sheet.

6. A vehicle carrying the nonaqueous electrolyte secondary battery according to claim 1.

* * * * *